(12) United States Patent
Raviv et al.

(10) Patent No.: US 9,538,215 B2
(45) Date of Patent: Jan. 3, 2017

(54) MAINTAINING CONTINUITY IN MEDIA STREAMING

(71) Applicant: Gamefly Israel Ltd., Caesarea (IL)

(72) Inventors: Alon Raviv, Tel Aviv (IL); Asaf Barak, Yokneam (IL); Shai Doron, Megiddo (IL)

(73) Assignee: Gamefly Israel Ltd., Caesarea (IL)

( * ) Notice: Subject to any disclaimer, the term of this patent is extended or adjusted under 35 U.S.C. 154(b) by 666 days.

(21) Appl. No.: 13/796,364

(22) Filed: Mar. 12, 2013

(65) Prior Publication Data

US 2014/0267898 A1 Sep. 18, 2014

(51) Int. Cl.
*H04N 21/24* (2011.01)
*H04N 21/234* (2011.01)

(52) U.S. Cl.
CPC .... *H04N 21/2402* (2013.01); *H04N 21/23406* (2013.01); *H04N 21/2407* (2013.01)

(58) Field of Classification Search
CPC .......... H04N 7/01; H04N 19/40; H04N 19/61; H04N 19/164; H04N 19/177; H04N 19/149; H04N 21/2365
See application file for complete search history.

(56) References Cited

U.S. PATENT DOCUMENTS

| 8,982,896 B2* | 3/2015 | Pannell | 370/412 |
| 2006/0002469 A1* | 1/2006 | Zurov | H04N 19/172 375/240.12 |
| 2007/0053428 A1* | 3/2007 | Saleem | H04N 19/0009 375/240 |
| 2009/0041114 A1* | 2/2009 | Clark | H04L 43/0829 375/240.01 |
| 2012/0230348 A1* | 9/2012 | Pannell | H04L 47/6215 370/437 |
| 2012/0275511 A1* | 11/2012 | Shemer et al. | 375/240.02 |

* cited by examiner

*Primary Examiner* — Leron Beck
*Assistant Examiner* — Kehinde O Abimbola
(74) *Attorney, Agent, or Firm* — Morrison & Foerster LLP

(57) ABSTRACT

A method and apparatus for transmitting frames, the method comprising: determining a maximal frame size, maximal frame size violation threshold larger than the maximal frame size, maximal bitrate and maximal transmission time; receiving a frame to be transmitted, the frame having a size; responsive to the size not exceeding the maximal frame size: transmitting the frame during a time period not exceeding the maximal transmission time; responsive to the size exceeding the maximal frame size but not exceeding the maximal frame size violation threshold: transmitting the frame at a bitrate substantially equal to the maximal bitrate; and transmitting at least one subsequent frame during a time period shorter than the maximal transmission time; and responsive to the size exceeding the maximal frame size violation threshold: transmitting the frame; and skipping one or more subsequent frames.

13 Claims, 3 Drawing Sheets

MAINTAINING CONTINUITY IN MEDIA STREAMING

TECHNICAL FIELD

The present disclosure relates to media streaming in general, and to a method and apparatus for maintaining continuity in media streaming, in particular.

BACKGROUND

Streaming media relates to constant delivery of media by a provider, to be received by and presented to an end-user.

Streaming may be used for any type of information such as data, audio or video, and content such as music, movies, games, closed captioning, stock ticker, real-time text, or any other data to be streamed or broadcast. When receiving streamed media, a client media player can start playing or otherwise utilizing the data once a predetermined buffer is filled with received contents and does not need to wait for the full data. This is particularly true when not all the data is a-priori available, such as in gaming applications.

Common environments or applications of streaming media include but are not limited to interactive television information systems such as video on-demand (VoD) providing pre-ready contents or games, and internet television.

Streaming media has become more and more popular due to a number of reasons, including the increased network bandwidth, especially in the last mile, increased access to and commercialization of networks, especially the Internet, and the use of standard protocols and formats, such as TCP/IP, HTTP, and HTML.

A media stream can be streamed either live or on-demand. Live streams are generally provided by a means called "true streaming", which sends the information without saving the file to a hard disk. On-demand streaming may be provided by a means called progressive streaming or progressive download, which saves the file to a hard disk and then plays it from that location. On-demand streams may be saved to hard disks and servers for extended amounts of time, while the live streams are only generated and available at one time e.g., during an interactive game, a broadcast game or others.

An architecture for live or on-demand services in systems such as but not limited to cable television (CATV) systems may include a plurality of sources, such as files, game servers or others which retrieve or render a sequence of frames; optionally one or more encryption engines, for encrypting the streamed frames; and one or more edge devices, each of which packetizes sub-sets of input streams into a multi program/service transport stream (MPTS) format, modulates each MPTS through a quadrature amplitude modulation (QAM), and transmits the radio frequency (RF) modulated signal to the set top box at the client's premises.

In order to save transmission time, the data may be compressed prior to sending, and decompressed by the client device. The selected type of compression and streaming may be based on the types of the data, the clients and the communication channels.

For example, audio streams may be compressed using an audio codec such as MP3, Vorbis or AAC, while video streams may be compressed using a video codec such as H.264/MPEG-4 or VP8. The stream may be delivered from a streaming server to a streaming client using a transport protocol, such as MMS or RTP. The streaming client may interact with the streaming server using a control protocol, such as MMS or RTSP.

In some applications, in particular fast-paced gaming applications, the streaming rate and quality is of particular importance. Freezing the frame for over a predetermined period of time, or degrading the quality of frames may be unacceptable to users. It is thus required to transmit frames in sufficient rate and streaming quality.

BRIEF SUMMARY OF THE INVENTION

One exemplary embodiment of the disclosed subject matter is a computer-implemented method performed by a computerized device, comprising: determining a maximal frame size, maximal frame size violation threshold larger than the maximal frame size, maximal bitrate and maximal transmission time; receiving a frame to be transmitted, the frame having a size; responsive to the size not exceeding the maximal frame size: transmitting the frame during a time period not exceeding the maximal transmission time; responsive to the size exceeding the maximal frame size but not exceeding the maximal frame size violation threshold: transmitting the frame at a bitrate substantially equal to the maximal bitrate; and transmitting at least one subsequent frame during a time period shorter than the maximal transmission time; and responsive to the size exceeding the maximal frame size violation threshold: transmitting the frame; and skipping one or more subsequent frame. Within the method, the frame is optionally selected from the group consisting of: an MPEG-encoded frame, ITU-T H264 recommendation frame, and a Joint Video Team of ISO/IEC MPEG and ITU-T VCEG frame. Within the method, the maximal frame size violation threshold is optionally determined so as to provide for transmission while avoiding skipping frames, creating delay between a transmitting end and a receiving end, and reducing frame quality. Within the method, the frame size violation threshold is optionally set to about twice the maximal frame size.

Another exemplary embodiment of the disclosed subject matter is a computer-implemented method performed by a computerized device, comprising: receiving a frame to be transmitted, the frame having a size; determining whether the size exceeds a maximal frame size which may be streamed in a maximal time; responsive to the size being below the maximal frame size: transmitting the frame in bitrate corresponding to an accumulated delay; and reducing the accumulated delay if required; and responsive to the size exceeding the maximal frame size: determining whether the size exceeds a frame size violation threshold; responsive to the size not exceeding the frame size violation threshold: transmitting the frame in maximal bitrate; increasing the accumulated delay by a difference between an image transmission time and the maximal image transmission time; and responsive to the size exceeding the frame size violation threshold: transmitting the frame; and skipping one or more subsequent frames. Within the method, the number of skipped frames is optionally determined as a highest integer lower than the size divided by the maximal frame size, minus one. Within the method, the frame is optionally selected from the group consisting of: an MPEG-encoded frame, ITU-T H264 recommendation frame, and a Joint Video Team of ISO/IEC MPEG and ITU-T VCEG frame. The frame may further comprise determining the maximal frame size violation threshold so as to provide for transmission while avoiding skipping frames, creating delay between a transmitting end and a receiving end, and reducing frame quality. Within the method, the frame size violation threshold is optionally set to about twice the maximal frame size.

Yet another exemplary embodiment of the disclosed subject matter is an apparatus having a processing unit and a storage device, the apparatus comprising: an encoder for generating one or more frames to be transmitted; a frame receiving component for receiving the frames from the encoder; a frame transmitting component for transmitting the frames; and a frame transmit time and frame skipping determination component configured to: responsive to a size of the frame not exceeding a maximal frame size: transmitting the frame during a time period not longer than a maximal transmission time; responsive to the size of the frame exceeding the maximal frame size but not exceeding a maximal frame size violation threshold: transmitting the frame at a bitrate substantially equal to a maximal bitrate; and transmitting subsequent frame during a time period shorter than the maximal transmission time; and responsive to the size exceeding the maximal frame size violation threshold: transmitting the frame; and skipping one or more subsequent frames. Within the apparatus, the frame is optionally selected from the group consisting of: an MPEG-encoded frame, ITU-T H264 recommendation frame, and a Joint Video Team of ISO/IEC MPEG and ITU-T VCEG frame. The apparatus may further comprise a frame size violation threshold determining component for determining the maximal frame size violation threshold so as to provide for transmission while avoiding skipping frames, creating delay between a transmitting end and a receiving end, and reducing frame quality.

Yet another exemplary embodiment of the disclosed subject matter is a computer program product comprising: a non-transitory computer readable medium; a first program instruction for determining a maximal frame size, maximal frame size violation threshold larger than the maximal frame size, maximal bitrate and maximal transmission time; a second program instruction for receiving a frame to be transmitted, the frame having a size; and a third program instruction for: responsive to the size not exceeding the maximal frame size: transmitting the frame during a time period not exceeding the maximal transmission time; responsive to the size exceeding the maximal frame size but not exceeding the maximal frame size violation threshold: transmitting the frame at a bitrate substantially equal to the maximal bitrate; and transmitting one or more subsequent frames during a time period shorter than the maximal transmission time; and responsive to the size exceeding the maximal frame size violation threshold: transmitting the frame; and skipping one or more frames, wherein said first, second and third program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figures 1A, 1B, 1C:
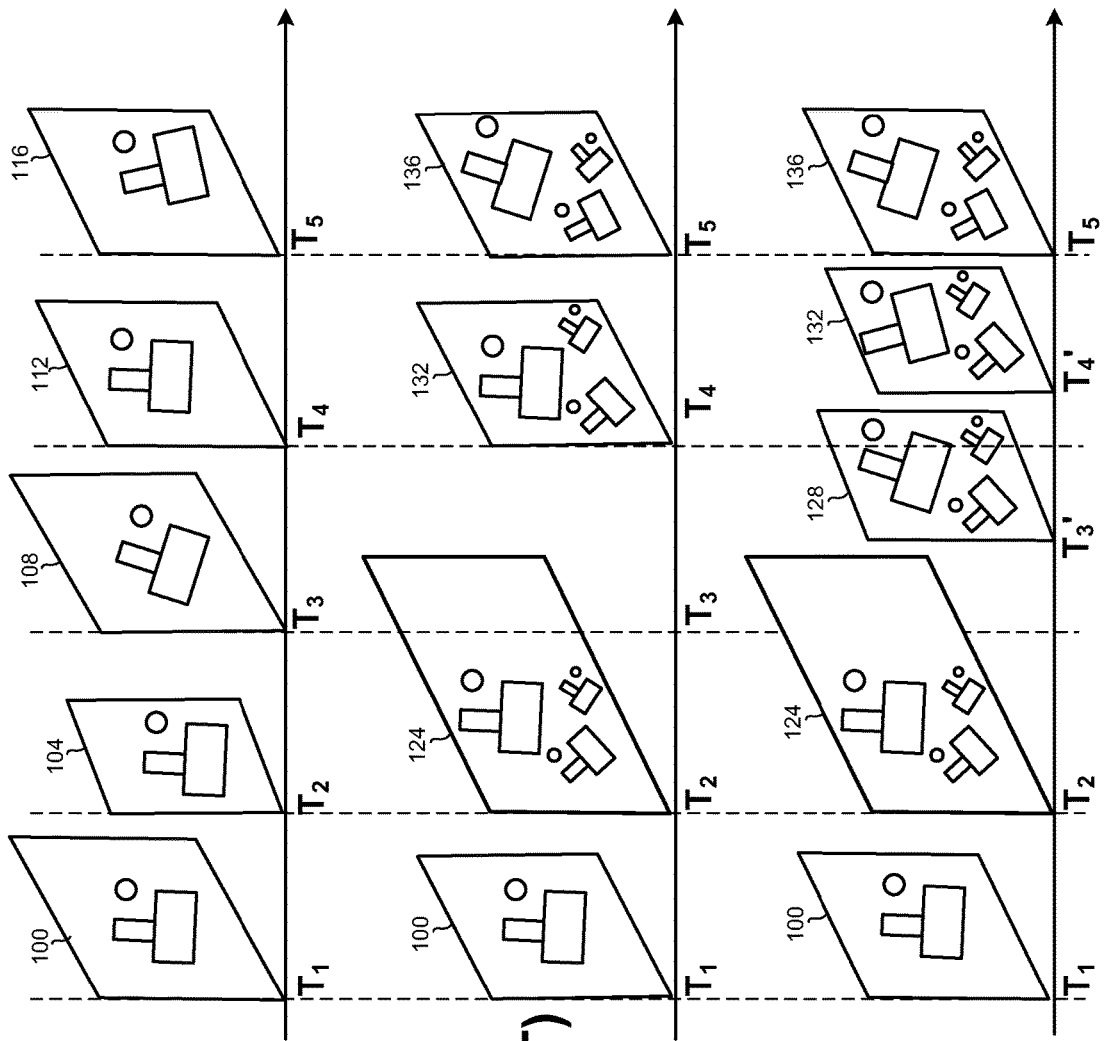
FIG. 1A shows an illustrative example of streaming frames.
FIG. 1B shows an illustrative example of streaming frames, with a frame skipping solution used in prior art systems.
FIG. 1C shows an illustrative example of streaming frames and compensating for large frames, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need to provide smooth broadcast when streaming media comprising a sequence of frames, regardless of the size of the streamed frames which may vary significantly, such that large frames will not cause delays, discontinuities or other quality-reducing effects.

In many applications, in order to reduce transmission time and volume, the frames are compressed prior to being streamed. One popular compression method uses the H.264/MPEG-4 protocol. This protocol may create frames of uneven size, due to multiple factors and in particular the use of previously encoded frames as references to a current frame. Thus, when the frame changes significantly relatively to a previous frame, for example when changing scenes, the first one or more frames may be much larger than further frames.

In order to provide smooth streaming, the frame streaming rate may be constant, for example a new frame may be streamed at most every predetermined time, for example 33 mSec, such that the player at the end user's device may receive and display a new frame every 33 mSec. The streaming time may be determined based upon the maximal bitrate enabled by the communication infrastructure and the equipment at the transmitting and receiving ends.

However, even if the predetermined streaming time is sufficient for most frames, some frames, such as the first frames after a scene change when MPEG compression is used, may be too large and it may be impossible to stream them in the predetermined time. This may create a time delay, e.g., a situation in which the available buffer is not full to the required level. In order to compensate for the time delay, some frames following the large frames may be skipped. However, skipping frames may create discontinuities in the displayed stream and may give the user an impression of low quality. This is especially true for fast-paced applications such as certain games or movies. Another alternative is to reduce the quality of large frames, which naturally reduces the quality of the displayed movie, game or the like.

One technical solution comprises changing the transmission time of frames as follows:

Determining:

a maximal transmission bitrate, determined in compliance with the infrastructure and the streaming and end user devices;

a maximal transmission time which complies with the required frame rate to be received by the user, for example 33 mSec per frame;

a maximal frame size which can be streamed at the maximal transmission bitrate during a maximal transmission time; and a maximal frame size violation threshold, such that a frame having a size less than or equal to the violation threshold, causes no further frames to be skipped.

Then for each frame received:

If the frame size does not exceed the maximal frame size: then the frame is transmitted in the maximal transmission time, or a shorter time, particularly but not exclusively if accumulated time delay exists.

If the frame size exceeds the maximal frame size but is under the maximal frame size violation threshold, then: the frame is transmitted at a high bitrate, for example substantially equal to the maximal bitrate, and one or more following frames are transmitted on a time period shorter (or equal to) than they would normally be transmitted, for example using the maximal bitrate.

If the frame size exceeds the maximal frame size violation threshold, then: the frame is transmitted at a high bitrate, for example substantially equal to the maximal bitrate, and one or more following frames are skipped to compensate for the caused or accumulated delay. Optionally, in addition to skipping one or more frames, one or more other frames may be transmitted on a time period shorter (or equal to) than they would normally be transmitted, for example using a maximal bitrate.

In more details, the solution comprises determining a single frame streaming time referred to as $T_{max}$, which is derived from the maximal enabled bitrate (MBR). Then a frame is streamed every $T_{max}$ period. As long as the frame size is under $T_{max}$*MBR, the frame will not cause delay, such that the following frame may be streamed and received after the expected period of time.

A threshold may be defined as the maximal allowed frame size violation. This value may be for example up to 2-5 of the maximal frame size.

If a frame to be transmitted is larger than the maximal frame size but smaller than the frame size threshold, the next frames after the large frame may be transmitted at a higher rate than they would normally be transmitted, wherein the rate may be determined in accordance with the size of the large frame. Thus, the streaming time of the following frames will be shorter and subsequent frames may be streamed earlier, until the gap is closed and no accumulated delay exists anymore. If the size of the frame exceeds the threshold, then the delay cannot be compensated in an acceptable number of frames, so some frames will be skipped.

One technical effect of utilizing the disclosed subject matter is smoothing the streaming even when larger than expected frames are to be streamed. The streaming of large frames, at least those smaller than a threshold, eliminates skipping of further frames, nor is the quality of the large frame decreased, and the bitrate limitation is not violated, thus preserving the frame rate as well as the quality, which may be crucial in some applications, for example applications in which the receiving side has to act upon the received frames or in close-loop interaction with the source device.

Referring now to FIGS. 1A-1C showing illustrative examples of streaming frames. It will be appreciated that the term frame is used for convenience and is not intended to limit the scope of the current application. The disclosed methods and apparatus may be used with any information unit, access unit, or the like.

It will be appreciated that the different frame sizes shown in FIGS. 1A-1C are intended to visualize differences in the volume of frames which may be measured in bits, bytes or the like, rather than their physical size in length units, or the like. Thus, the term "frame size" in the current context relates to the digital size, and not to a physical size. For example, when a frame is compressed using lossless compression, its digital size is reduced, while its physical size does not.

FIG. 1A shows a series of frames 100, 104, 108, 112, and 116 streamed into a communication channel, so that they may be received by an end device or transferred to another channel at the other end of the communication channel.

Although the frame sizes vary, each of the frames in FIG. 1A, including the largest ones, can be transmitted in at most the constant time period such as $T_2-T_1$, $T_3-T_2$, etc.

In FIG. 1B, the first frame is frame 100 which is the same as in FIG. 1. However, the second frame is frame 124 which is larger than frame 104 and cannot be streamed in the constant time period. If frame 124 is streamed starting at time $T_2$, the transmission will end after time $T_3$, such that the third frame, regardless of its size, cannot be transmitted on time.

In such situations, prior art solutions skip the next one or more frames, such as the frame that should have been transmitted between frame 124 and frame 132, and resume frame transmission on the frame that can be started on its intended time, such as frame 132 transmitted starting at time $T_4$.

In FIG. 1C frames 100 and 124 are streamed starting at times $T_1$ and $T_2$ respectively. Then the next frames, such as frame 128 and frame 132 are transmitted in shorter time than they would normally be transmitted, i.e., in higher bitrate, until the time delay caused by the large frame such as frame 124 is compensated, and the next frame such as frame 136 can be transmitted starting at the intended time $T_5$ and using the normal streaming time.

However, if the large frame such as frame 124 would have been larger, for example 10 times an average frame, compensation by using a higher bitrate when streaming the following frames would not be acceptable, due to the large number of frames required to be transmitted at high bitrate. Therefore, a threshold may be set such that frames larger than the maximal frame size but smaller than the threshold may be streamed followed by streaming a number of frames in a higher bitrate, while transmitting frames larger than the threshold are followed by skipping of one or more frames.

Using this approach, all frame size violations that may be compensated for in at most a predetermined number of subsequent frames are indeed compensated without skipping frames and without degrading the quality of any frame.

Figure 2:
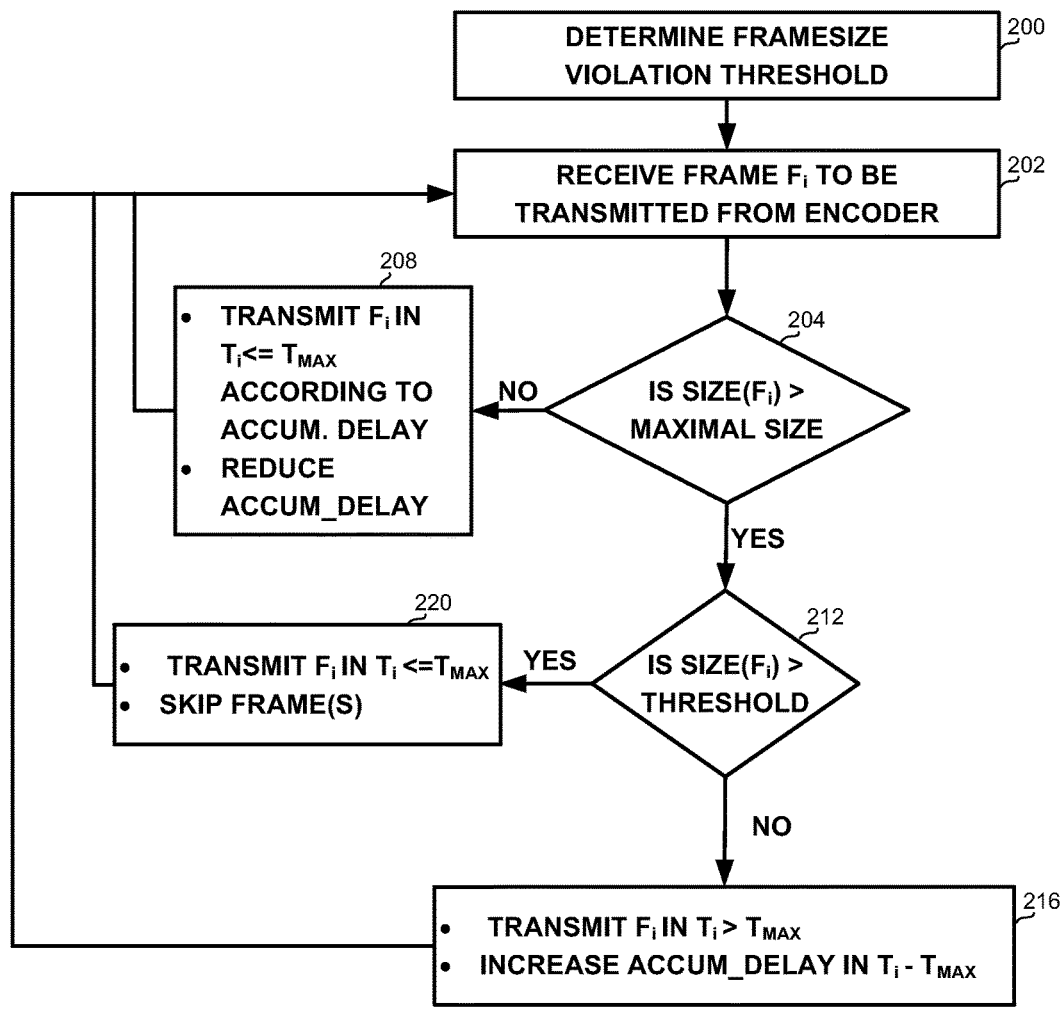
FIG. 2 shows a flowchart diagram of a method for compensating for large frames in media streaming, in accordance with some exemplary embodiments of the disclosed subject matter.

Referring now to FIG. 2, showing a flowchart diagram of steps in a method for compensating for large frames in media streaming.

On step 200 a framesize violation threshold may be determined or received, such that the transmission of frames whose size do not exceed the threshold provides for avoiding delays between the source and the destination of the information, does not require skipping frames and does not require exceeding allowed or available bitrate. It will be appreciated that the framesize violation threshold may be determined once or received from an external source, and does not have to be determined for each transmitted stream. The framesize violation threshold may be determined based upon the available bitrate and required framerate, and may also be determined in accordance with the maximal framesize. For example, the maximal frame size can be determined as the ratio between the maximal bitrate and the required framerate. The framesize violation threshold can be determined as a product of the maximal framesize, for example between about 1.5 and about 5 the framesize, e.g., about twice the maximal framesize.

On step 202 a frame $F_t$ to be transmitted may be received from a source such as an encoder.

On step 204 it is determined whether the size of F, exceeds the normal size, referred to as maximal frame size. The maximal frame size may be determined as the maximal size of a frame that can be streamed during the maximal transmission time allowed per frame. For example, if a new frame is required to be received every 33 mSec, hereinafter referred to as $T_{max}$ and the maximal streaming bitrate is the maximal line rate, then the maximal frame size may be set to the maximal line rate*$T_{max}$.

If the frame size does not exceed maximal frame size, then on step 208 the frame may be streamed at the maximal allowed duration, $T_{max}$ or a shorter duration. If an accumulated delay value is positive due to large images not yet fully compensated for, and the image is smaller than the maximal frame size, then the image may be streamed at a higher bitrate, such that the streaming takes less than $T_{max}$.

The bitrate for streaming the frame may be determined as follows: SizeRatio may be defined as the ratio between the maximal frame size and the current frame size. This provides a number larger than one since the frame size does not exceed the maximal frame size.

Thus, if the frame size does not exceed the maximal frame size and there is no accumulated delay, then the frame is transmitted as usual, using the maximal transmission time or less.

If the accumulated delay is larger than zero, then: the transmission bit rate is multiplied by SizeRatio, thus increasing the bitrate reducing the streaming duration. In addition, the accumulated delay may be reduced by (SizeRatio−1)*$T_{max}$.

If, however, it is determined on step 204 that the frame size exceeds the maximal frame size, then it is determined on step 212 whether the frame size is larger than a maximal frame size violation threshold, which may be for example up to 2-5 times the maximal frame size.

If it does not exceed the maximal frame size violation threshold then on step 216 the frame is transmitted in substantially the maximal enabled bitrate, which streaming takes a time period longer than $T_{max}$. Additionally, the accumulated delay is increased in the difference between the streaming time and $T_{max}$. Execution may then go back to step 200 to receive the next frame, and the bitrate determined for the following frames will compensate for the accumulated delay.

If the frame size exceeds the threshold, then on step 220 the frame may be transmitted in a rate substantially equal to or smaller than the maximal bit rate so as not to increase the accumulated delay more than necessary. In addition, a number of subsequent frames may be skipped. In some embodiments, the number of skipped frames may be determined as the highest integer lower than (frame size/the maximal frame size)−1.

Figure 3:
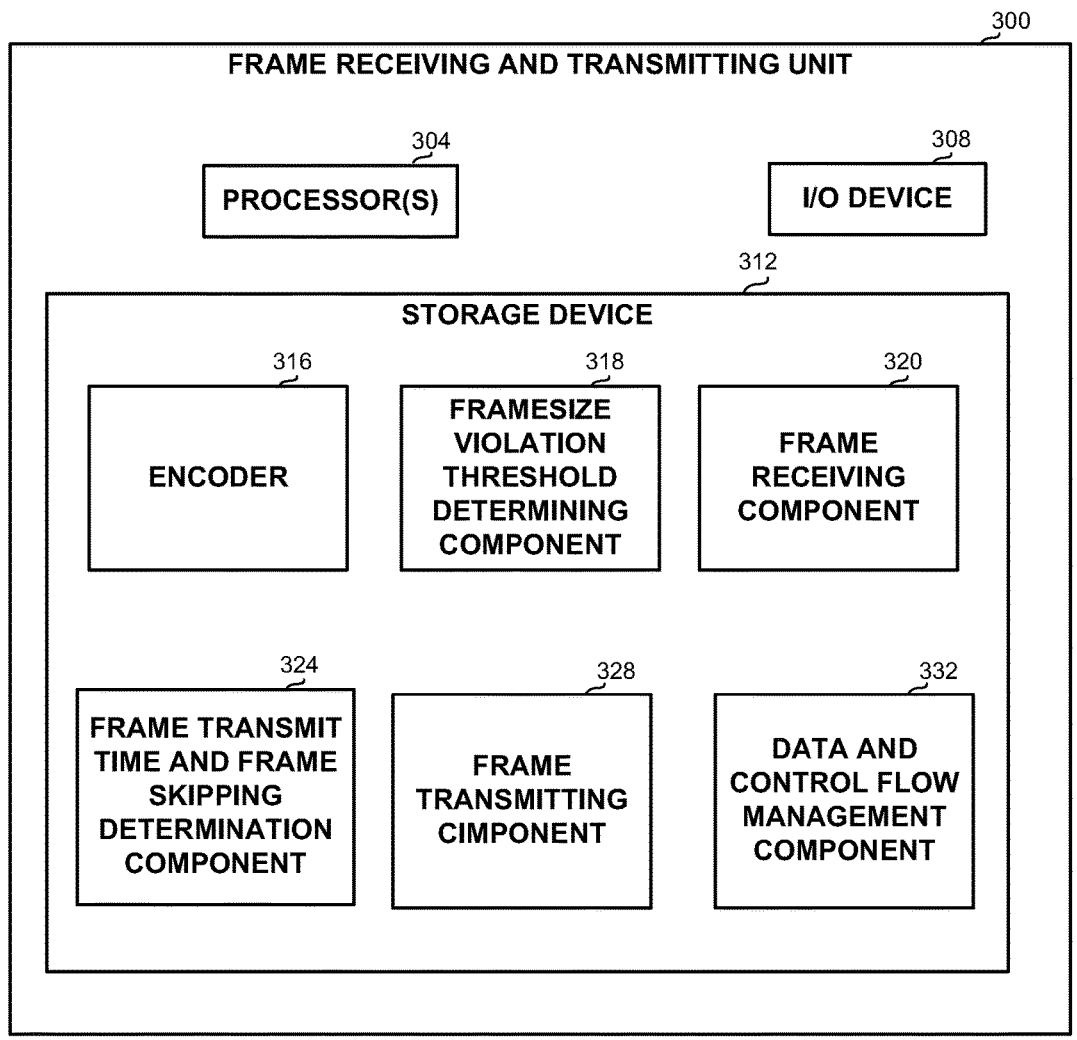
FIG. 3 shows a block diagram of an apparatus for compensating for large frames in media streaming, in accordance with some exemplary embodiments of the disclosed subject matter.

Referring now to FIG. 3, showing a block diagram of an apparatus for compensating for large frames in media streaming.

The system may comprise a frame receiving and transmitting unit 300 which may be implemented as a computing device, which may comprise one or more processors 304, or loaded to and executed by such computing device. Any of processors 304 may be a Central Processing Unit (CPU), a microprocessor, an electronic circuit, an Integrated Circuit (IC) or the like. Alternatively, computing device 300 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 304 may be utilized to perform computations required by frame receiving and transmitting unit 300 or any of it subcomponents.

In some embodiments, frame receiving and transmitting unit 300 may comprise an input-output (I/O) device 308 such as a terminal, a display, a keyboard, a mouse, a touch screen, an input device or the like to interact with the system, to invoke the system and to receive activity indications or error messages. It will however be appreciated that the system can operate without human operation and without I/O device 308.

Frame receiving and transmitting unit 300 may comprise one or more storage devices 312 for storing executable components, and which may also contain data during execution of one or more components. Storage device 312 may be persistent or volatile. For example, storage device 312 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause any of processors 304 to perform acts associated with any of the steps shown in FIG. 2 above, for example determining bitrate for frame transmission, determining number of frames to skip, or the like.

The components detailed below may be implemented as one or more sets of interrelated computer instructions, executed for example by any of processors 304 or by another processor. The components may be arranged as one or more executable files, dynamic libraries, static libraries, methods, functions, services, or the like, programmed in any programming language and under any computing environment.

Storage device 312 may optionally comprise or receive data from encoder 316 responsible for generating frames to be transmitted via a communication channel to one or more end users. The frames may vary in size, depending on their content, the content of preceding or following frames, compression or encryption methods used, or the like. For example, in MPEG compression methods, frames may be encoded as a collection of changes relatively to a previous frame. Thus, in scene changes or in a fast-changing frame sequence, a frame may be significantly larger than a previous or a following frame.

Storage device 312 may comprise frame receiving component 318 for receiving or determining a framesize violation threshold. The threshold may be determined such that the transmission of frames whose size do not exceed the threshold can be achieved while avoiding delays between the source and the destination of the information, does not require skipping frames and does not require exceeding allowed or available bitrate. It will be appreciated that the framesize violation threshold may be determined once or received form an external source, and does not have to be determined for each transmitted stream.

Storage device 312 may comprise frame receiving component 320 for receiving frames from encoder 316.

Storage device 312 may comprise frame transmit time and frame skipping determination component 324, for determining or receiving the size of each frame, and determining the frame transmission time and optionally a number of frames to be skipped after the current frame. Frame transmit time and frame skipping determination component 324 may operate in accordance with the flowchart presented in FIG. 2 and described above. If it was determined when processing a previous frame that a current frame is to be skipped then this determination may be omitted.

Storage device 312 may comprise frame transmitting component 328 for transmitting the frame and optionally skipping the following frames if such skipping was determined by frame transmit time and frame skipping determination component 324.

Storage device 312 may also comprise data and control flow management component 332, for managing the information and control flow among the detailed components. For example, passing the frames from encoder 316 to frame receiving component 320, passing the frames and the transmission time from frame transmit time and frame skipping determination component 324 to frame transmitting component 328, or the like.

It will be appreciated that the system described may constitute a part of a headend unit responsible for receiving commands and data from a user, generating or retrieving corresponding information, and transmitting the information to the user. Headend unit may also be responsible for broadcasting other data such as TV broadcasts to a multiplicity of users.

It will be appreciated that the disclosed method and apparatus are not limited to frames comprising images, but can be applied also for transmitting or otherwise utilizing a stream of any type of data which may consist of separate units.

The disclosed methods and apparatus are not limited to a particular field and may be used in any application in which it is required to maintain low delay and minimize time gaps between a transmitting end and a receiving end of information, wherein the information may be real-time information which may be generated prior to transmission rather than retrieved from storage.

Maintaining the low delay may be particularly important in applications in which a system or a person at the receiving end is to act upon information received from the sending end or interact in a timely manner with the source, for example tele-surgery or other telemedicine operations, surveillance applications, receiving images from an unmanned aerial vehicle and reacting accordingly, or the like.

The disclosed method and apparatus provide for smooth streaming of a frame stream, by compensating for the long transmission time of frames larger than the maximal frame size, by accelerating the transmission rate of one or more following frames, and avoiding skipping frames to the extent possible. The disclosed method and apparatus thus provide for maintaining low delay between a sending end and a receiving end of information, without skipping frames, decreasing frame quality or requiring higher bitrate than a predetermined or given threshold.

The disclosed method and apparatus may operate with any known encoding method, such as but not limited to MPEG, ITU-T H264 recommendation, Joint Video Team of ISO/IEC MPEG, ITU-T VCEG, or others.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a computerized device, comprising:
   determining a maximal frame size, maximal frame size violation threshold larger than the maximal frame size, maximal bitrate and maximal transmission time;
   receiving an encoded frame to be transmitted, the encoded frame having a size;
   responsive to the size not exceeding the maximal frame size:
      transmitting the encoded frame over a communication channel during a time period not exceeding the maximal transmission time;
   responsive to the size exceeding the maximal frame size but not exceeding the maximal frame size violation threshold:
      transmitting the encoded frame at a bitrate substantially equal to the maximal bitrate over the communication channel; and
      transmitting at least one subsequent encoded frame over the communication channel during a time period shorter than the maximal transmission time; and
   responsive to the size exceeding the maximal frame size violation threshold:
      transmitting the encoded frame over the communication channel; and
      skipping at least one subsequent frame.

2. The computer-implemented method of claim 1, wherein the encoded frame is of a format selected from the group consisting of: an MPEG-encoded frame, ITU-T H264 recommendation frame, and a Joint Video Team of ISO/IEC MPEG and ITU-T VCEG frame.

3. The computer-implemented method of claim 1, wherein the maximal frame size violation threshold is determined so as to provide for transmission while avoiding skipping frames, creating delay between a transmitting end and a receiving end, and reducing frame quality.

4. The computer-implemented method of claim 3, wherein the frame size violation threshold is set to about twice the maximal frame size.

5. A computer-implemented method performed by a computerized device, comprising:
   receiving an encoded frame to be transmitted, the encoded frame having a size;
   determining whether the size exceeds a maximal frame size which may be streamed in a maximal image transmission time;
   responsive to the size being below the maximal frame size:
      transmitting the encoded frame over a communication channel in bitrate corresponding to an accumulated delay; and
      reducing the accumulated delay if required; and
   responsive to the size exceeding the maximal frame size:
      determining whether the size exceeds a frame size violation threshold;
      responsive to the size not exceeding the frame size violation threshold:
         transmitting the encoded frame in maximal bitrate over the communication channel;
         increasing the accumulated delay by a difference between an image transmission time and the maximal image transmission time; and responsive to the size exceeding the frame size violation threshold:
  transmitting the encoded frame over the communication channel; and
  skipping at least one subsequent frame.

6. The computer-implemented method of claim 5, wherein a number of the at least one subsequent frames is determined as a highest integer lower than the size divided by the maximal frame size, minus one.

7. The computer-implemented method of claim 5, wherein the encoded frame is of a format selected from the group consisting of: an MPEG-encoded frame, ITU-T H264 recommendation frame, and a Joint Video Team of ISO/IEC MPEG and ITU-T VCEG frame.

8. The computer-implemented method of claim 5, further comprising determining the frame size violation threshold so as to provide for transmission while avoiding skipping frames, creating delay between a transmitting end and a receiving end, and reducing frame quality.

9. The computer-implemented method of claim 8, wherein the frame size violation threshold is set to about twice the maximal frame size.

10. An apparatus having a processing unit and a storage device, the apparatus comprising:
  an encoder for generating at least one frame to be transmitted;
  a frame receiving component for receiving an at least one encoded frame from the encoder;
  a frame transmitting component for transmitting the at least one encoded frame; and
  a frame transmit time and frame skipping determination component configured to:
    responsive to a size of the at least one encoded frame not exceeding a maximal frame size:
      transmitting the at least one encoded frame during a time period not longer than a maximal transmission time;
    responsive to the size of the at least one encoded frame exceeding the maximal frame size but not exceeding a maximal frame size violation threshold:
      transmitting the at least one encoded frame at a bitrate substantially equal to a maximal bitrate; and
      transmitting at least one subsequent encoded frame during a time period shorter than the maximal transmission time; and
    responsive to the size exceeding the maximal frame size violation threshold:
      transmitting the encoded frame; and
      skipping at least one subsequent frame.

11. The apparatus of claim 9, wherein the at least one encoded frame is of a format selected from the group consisting of: an MPEG-encoded frame, ITU-T H264 recommendation frame, and a Joint Video Team of ISO/IEC MPEG and ITU-T VCEG frame.

12. The apparatus of claim 9 further comprising a frame-size violation threshold determining component for determining the maximal frame size violation threshold so as to provide for transmission while avoiding skipping frames, creating delay between a transmitting end and a receiving end, and reducing frame quality.

13. A computer program product comprising:
  a non-transitory computer readable medium;
  a first program instruction for determining a maximal frame size, maximal frame size violation threshold larger than the maximal frame size, maximal bitrate and maximal transmission time;
  a second program instruction for receiving an encoded frame to be transmitted, the encoded frame having a size; and
  a third program instruction for:
  responsive to the size not exceeding the maximal frame size:
    transmitting the encoded frame during a time period not exceeding the maximal transmission time;
  responsive to the size exceeding the maximal frame size but not exceeding the maximal frame size violation threshold:
    transmitting the encoded frame at a bitrate substantially equal to the maximal bitrate; and
    transmitting at least one subsequent encoded frame during a time period shorter than the maximal transmission time; and
  responsive to the size exceeding the maximal frame size violation threshold:
    transmitting the encoded frame; and
    skipping at least one subsequent frame,
  wherein said first, second and third program instructions are stored on said non-transitory computer readable medium.

* * * * *